US012797268B2

(12) United States Patent
Lee et al.

(10) Patent No.: US 12,797,268 B2
(45) Date of Patent: Nov. 17, 2026

(54) DOOR RAMP STRUCTURE FOR VEHICLE

(71) Applicants: Hyundai Motor Company, Seoul (KR); Kia Corporation, Seoul (KR)

(72) Inventors: Jaeseung Lee, Hwaseong-si (KR); Gookhyun Jeon, Seoul (KR); Kyuhoon Cho, Suwon-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 436 days.

(21) Appl. No.: 18/505,519

(22) Filed: Nov. 9, 2023

(65) Prior Publication Data

US 2025/0017791 A1 Jan. 16, 2025

(30) Foreign Application Priority Data

Jul. 13, 2023 (KR) ........................ 10-2023-0090891

(51) Int. Cl.
*A61G 3/06* (2006.01)

(52) U.S. Cl.
CPC .................................... *A61G 3/061* (2013.01)

(58) Field of Classification Search
CPC . A61G 3/061; B60R 3/02; B60R 3/007; B60J 5/06
USPC .......................................................... 414/921
See application file for complete search history.

(56) References Cited

U.S. PATENT DOCUMENTS

| | | | | |
|---|---|---|---|---|
| 11,135,108 | B2 * | 10/2021 | Kim | A61G 3/061 |
| 11,472,326 | B1 * | 10/2022 | Nageshkar | B60P 1/435 |
| 12,383,444 | B2 * | 8/2025 | Oya | A61G 3/061 |

FOREIGN PATENT DOCUMENTS

| | | | | |
|---|---|---|---|---|
| DE | 102020200007 A1 * | 7/2021 | | B60P 1/435 |
| DE | 102021212984 A1 * | 5/2023 | | B60P 1/435 |
| EP | 3501467 B1 * | 1/2020 | | A61G 3/061 |

* cited by examiner

*Primary Examiner* — Gary S Hartmann
(74) *Attorney, Agent, or Firm* — Slater Matsil, LLP

(57) ABSTRACT

An embodiment door ramp structure includes a ramp assembly disposed inside a sliding door configured to open or close a door opening portion in a vehicle body of a vehicle. The ramp assembly is configured to selectively operate in connection with an operation of the sliding door. The ramp assembly includes a ramp panel configured to operate to be coupled and fixed to or decoupled from an inner surface of the sliding door. A mover is configured to be selectively coupled to or decoupled from a lower end of the ramp panel and to rotate to turn the ramp panel in a state in which the mover is coupled to the lower end of the ramp panel. A lead screw is coupled to the mover and configured to rotate the mover by rotating.

20 Claims, 28 Drawing Sheets

DOOR RAMP STRUCTURE FOR VEHICLE

CROSS-REFERENCE TO RELATED APPLICATIONS

This application claims the benefit of Korean Patent Application No. 10-2023-0090891, filed on Jul. 13, 2023, which application is hereby incorporated herein by reference.

TECHNICAL FIELD

The present invention relates to a door ramp structure for a vehicle.

BACKGROUND

In general, a vehicle has an occupant compartment having a predetermined size in which a driver or an accompanied occupant may be seated, and occupant compartment opening/closing doors are installed on a vehicle body to open or close the occupant compartment.

In the case of a passenger vehicle, the occupant compartment opening/closing doors include a front door installed at a front side in a length direction of the vehicle and a rear door installed at a rear side in the length direction of the vehicle. The front door and the rear door are typically installed on the vehicle body so as to be rotatable by means of hinges.

Meanwhile, in the case of a van in which multiple persons may be seated, the occupant compartment opening/closing doors slide forward and rearward in the length direction of the vehicle to open or close the occupant compartment.

In the case of the slide-type occupant compartment opening/closing door for a van, the occupant compartment opening/closing door is configured to move rearward in the length direction of the vehicle to open the occupant compartment and to move forward in the length direction of the vehicle to close the occupant compartment. Therefore, the slide-type occupant compartment opening/closing door has an advantage in that a space required to open or close the door is smaller in the slide-type occupant compartment opening/closing door than in the hinged occupant compartment opening/closing door applied to the passenger vehicle, and a door opening portion formed in the vehicle body may be completely opened even though the space required to open or close the door is small.

The slide-type door is equipped with an assistive entry/exit foothold (ramp system) for a disabled person. As the ramp system, there has been mainly used an underfloor insertion-type ramp system inserted into an underfloor of a vehicle and configured to protrude to the outside of the vehicle as necessary or a separate type ramp system that uses a separate device accommodated in a trunk space of a vehicle.

However, the underfloor insertion-type ramp system requires an excessive space at a lower end of a vehicle body, which causes a disadvantage in terms of spatial utilization. The separate type ramp system needs to be installed directly by a user, which causes an inconvenience in storing and using the separate type ramp system.

SUMMARY

The present invention relates to a door ramp structure for a vehicle. Particular embodiments relate to a door ramp structure coupled to a door and configured to selectively operate.

Embodiments of the present invention have been made in an effort to solve problems in the art, and an embodiment of the present invention provides a door ramp structure detachably installed on a sliding door of a vehicle and configured to selectively operate, thereby maximizing spatial utilization and reducing a weight.

A door ramp structure for a vehicle according to an embodiment of the present invention is installed on a sliding door configured to open or close a door opening portion formed in a vehicle body of a vehicle and includes a ramp assembly installed inside the door and configured to selectively operate when the door operates. The ramp assembly includes a ramp panel configured to operate to be coupled and fixed to or decoupled from an inner surface of the door, a mover configured to be selectively coupled to or decoupled from a lower end of the ramp panel and to rotate to turn the ramp panel when the mover is coupled to the lower end of the ramp panel, and a lead screw coupled to the mover and provided to rotate the mover by rotating.

A ramp ring may be provided on the ramp panel, and the ramp ring may be coupled to or decoupled from a lock bar provided at a position corresponding to the door, such that the ramp panel is coupled to or decoupled from the door.

The ramp ring may include an opening formed in a length direction of the vehicle body, and the lock bar may include a protruding portion protruding in the length direction of the vehicle body so that the protruding portion is inserted into or released from the opening.

The mover may be provided in the form of a bar extending in a length direction of the vehicle body and having a hollow portion therein.

A screw thread may be formed on an inner surface of the hollow portion of the mover and screw-coupled to a screw thread formed on an outer surface of the lead screw.

A coupling protrusion may be formed on an outer surface of the mover and coupled to or decoupled from, in a male/female engagement manner, the lower end of the ramp panel when the mover moves.

The ramp panel and the mover may be respectively provided as a pair of ramp panels and a pair of movers symmetrically provided at front and rear sides of the vehicle body.

The pair of movers may have screw threads inclined in different directions in a length direction of the vehicle body.

The ramp panel and the mover may be moved toward or away from each other in the length direction of the vehicle body by a rotation of the lead screw.

The movement of the ramp panel may be stopped when ends of the pair of ramp panels come into contact with each other as the pair of ramp panels is moved toward each other by the rotation of the lead screw in one direction, and the pair of ramp panels may be rotated toward the outside of the vehicle body by a continuous rotation of the lead screw in one direction in a state in which the pair of ramp panels is in contact with each other.

A motor may be provided at an end of the lead screw, and the lead screw may be rotated by an operation of the motor.

A coupling protrusion of the mover and the ramp panel may be decoupled when the ramp ring and the lock bar are coupled, and the coupling protrusion of the mover and the ramp panel may be coupled when the ramp ring and the lock bar are decoupled.

According to the embodiment of the present invention, the ramp structure, which is detachably installed on the sliding doors of the vehicle, is applied, which may easily ensure a space at the lower end of the vehicle body and reduce costs and weight.

In addition, the ramp structure, which selectively operates so as to be used or not used depending on whether the occupant is a general person or a disabled person, is applied, which may significantly improve usability and improve a convenience for the occupant.

DETAILED DESCRIPTION OF ILLUSTRATIVE EMBODIMENTS

Figure 1:
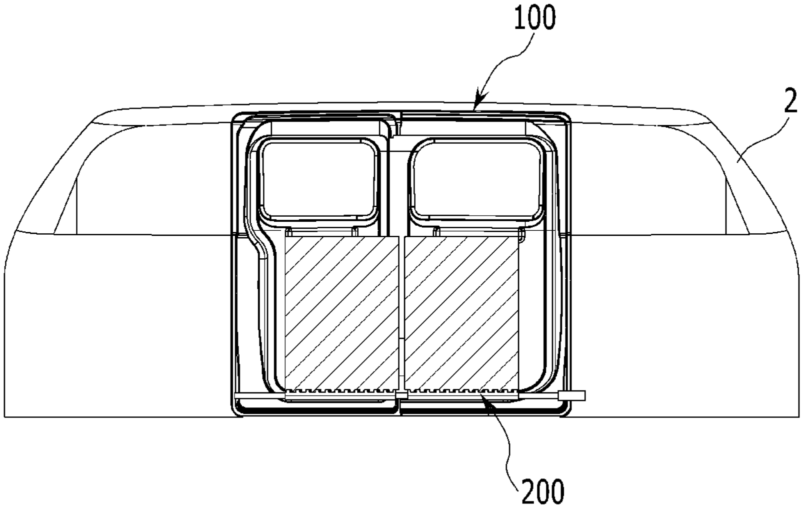
FIG. 1 is a view illustrating a vehicle interior state in which sliding doors equipped with a door ramp structure according to an embodiment of the present invention are closed.

Hereinafter, embodiments of the present invention will be described in detail with reference to the accompanying drawings so that those with ordinary skill in the art to which embodiments of the present invention pertain may easily carry out the embodiments. The embodiments of the present invention may be implemented in various different ways and are not limited to the embodiments described herein.

In addition, the constituent elements having the same configurations in several embodiments will be assigned with the same reference numerals and described only in the representative embodiment, and only the constituent elements, which are different from the constituent elements according to the representative embodiment, will be described in other embodiments.

It is noted that the drawings are schematic and are not illustrated based on actual scales. Relative dimensions and proportions of parts illustrated in the drawings are exaggerated or reduced in size for the purpose of clarity and convenience in the drawings, and any dimension is just illustrative but not restrictive. The same reference numerals designate the same structures, elements, or components illustrated in two or more drawings in order to exhibit similar characteristics. When one component is described as being positioned "above" or "on" another component, one component can be positioned "directly on" another component, and one component can also be positioned on another component with other components interposed therebetween.

The embodiments of the present invention specifically illustrate example embodiments of the present invention. As a result, various modifications of the drawings are expected. Therefore, the embodiments are not limited to specific forms in regions illustrated in the drawings, and for example, include modifications of forms by the manufacture thereof.

Hereinafter, a door ramp structure for a vehicle according to embodiments of the present invention will be described in detail with reference to the accompanying drawings.

Figure 2A:
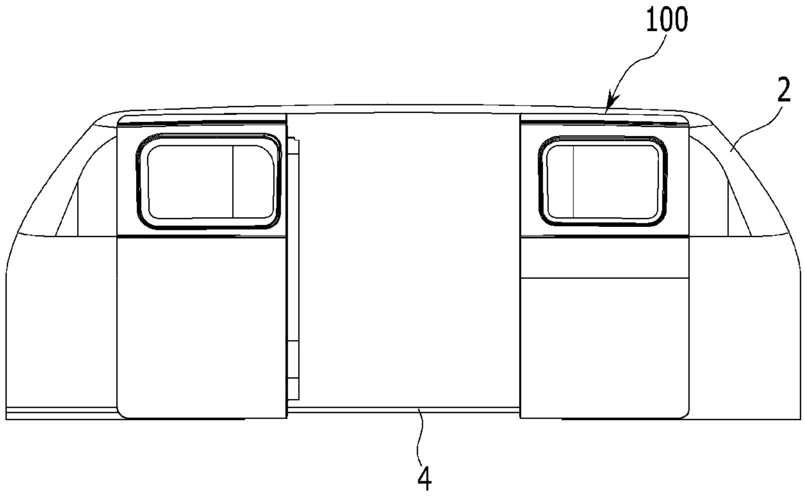
FIGS. 2A and 2B are views illustrating exterior and interior states of the vehicle in which the sliding doors equipped with the door ramp structure according to an embodiment of the present invention are opened.
Figure 2B:
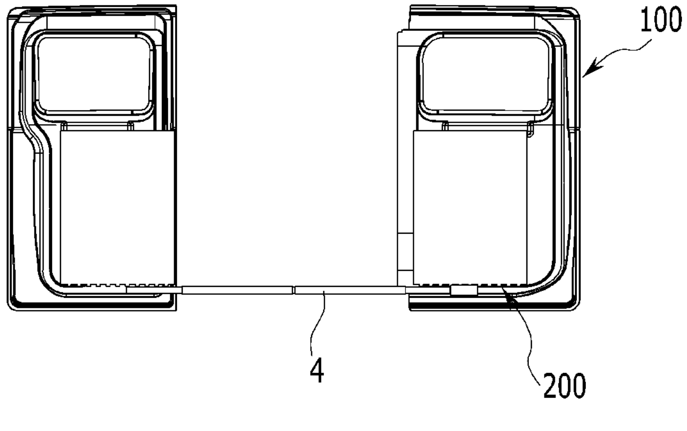
Figure 3A:
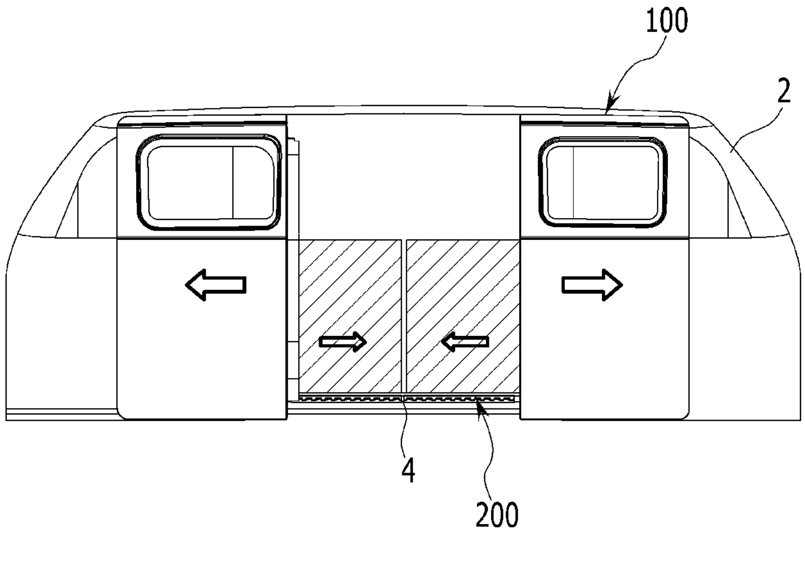
FIGS. 3A and 3B are views illustrating a vehicle exterior state in which the sliding doors equipped with the door ramp structure according to an embodiment of the present invention are opened and ramp panels are separated from the doors and rotated.
Figure 3B:
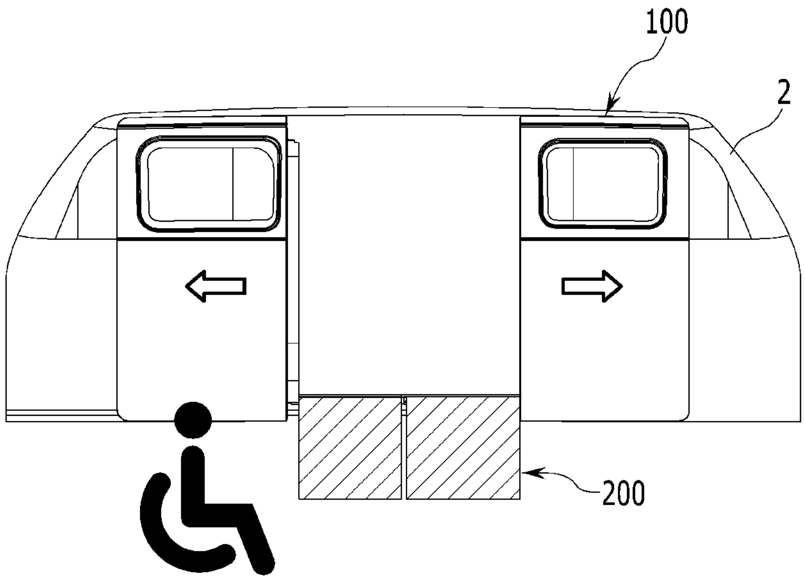

FIG. 1 is a view illustrating a vehicle interior state in which sliding doors equipped with a door ramp structure according to an embodiment of the present invention are closed, FIGS. 2A and 2B are views illustrating exterior and interior states of the vehicle in which the sliding doors equipped with the door ramp structure according to an embodiment of the present invention are opened, and FIGS. 3A and 3B are views illustrating a vehicle exterior state in which the sliding doors equipped with the door ramp structure according to an embodiment of the present invention are opened and ramp panels are separated from the doors and rotated.

With reference to FIGS. 1 to 3B, the door ramp structure for a vehicle according to an embodiment of the present invention is installed on sliding doors 100 configured to open or close a door opening portion formed in a vehicle body 2 of a vehicle and includes ramp assemblies 200 installed inside the doors 100.

The ramp assemblies 200 may be respectively installed on the front and rear sliding doors 100 of the vehicle body 2 and may selectively operate when the sliding doors 100 move forward and rearward. As illustrated in FIG. 1, in a state in which the sliding doors 100 are closed, the ramp assemblies 200 are respectively and fixedly coupled inside the front and rear sliding doors 100. As illustrated in FIGS. 2A and 2B, when the sliding doors 100 move forward and rearward, the ramp assemblies 200 may be respectively and fixedly coupled inside the front and rear sliding doors 100. As illustrated in FIGS. 3A and 3B, the ramp assemblies 200 may be decoupled from the front and rear sliding doors 100 and rotated.

With reference to FIGS. 3A and 3B, when the sliding doors 100 are moved forward and rearward and opened, the ramp assemblies 200 may be decoupled from the doors 100 and moved toward each other in a direction opposite to the forward and rearward movement directions of the doors 100. The ramp assemblies 200, which are moved toward each other, may be rotated toward the outside of the vehicle in a state in which the ramp assemblies 200 are in contact with each other. The rotated ramp assemblies 200 may serve as ramps for allowing an occupant to enter the vehicle.

Figure 4:
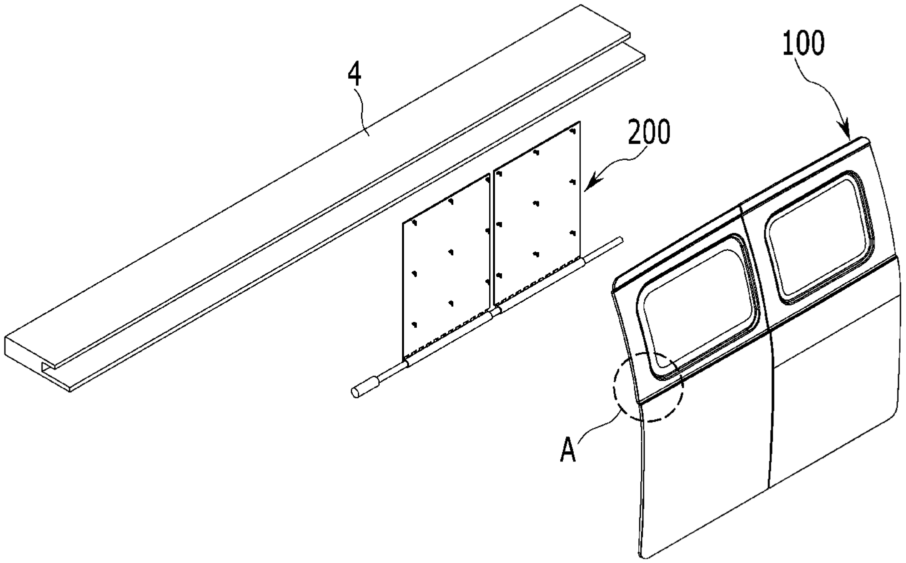
FIG. 4 is an exploded perspective view of the door ramp structure according to an embodiment of the present invention.

FIG. 4 is an exploded perspective view of the door ramp structure according to an embodiment of the present invention.

With reference to FIG. 4, the door ramp structure according to an embodiment of the present invention may include the doors 100 and the ramp assemblies 200 installed inside the doors 100. Lower ends of the ramp assemblies 200 may be connected to a floor member 4, which defines a lateral side of a bottom portion of the vehicle body 2, and may rotate about the floor member 4 in a direction perpendicular to the vehicle body.

Figure 5:
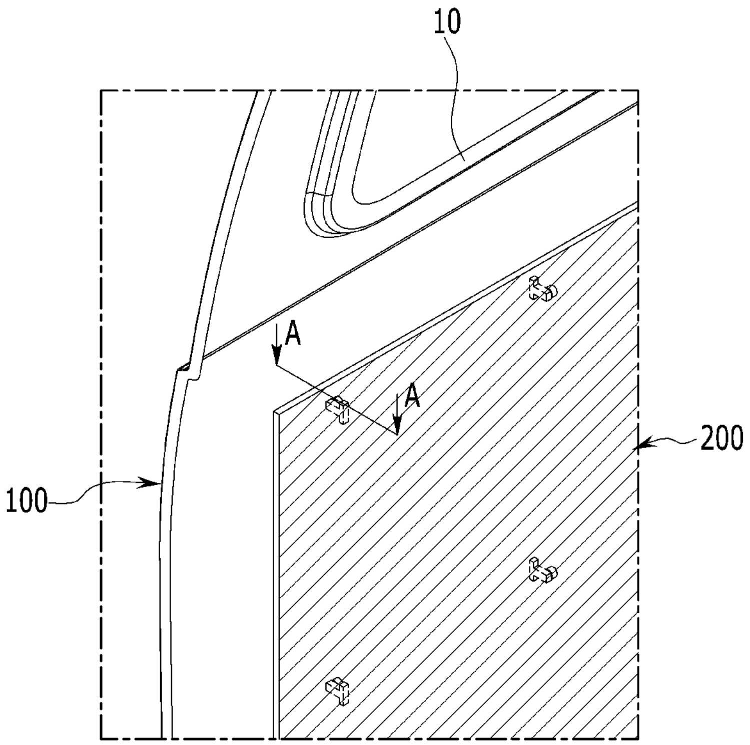
FIG. 5 is an enlarged view of part 'A' in FIG. 4.

FIG. 5 is an enlarged view of part ‘A’ in FIG. 4.

As illustrated in FIG. 5, the ramp assembly 200 is attached and coupled to an inner surface of the door 100. To this end, a plurality of lock bars 10 is provided on the inner surface of the door 100 and disposed on the entire inner surface of the door 100. In addition, a plurality of ramp rings 50, which is coupled to the lock bars 10, is disposed on an inner surface of the ramp assembly 200 that faces the door 100. The ramp rings 50 are provided at positions corresponding to the lock bars 10.

Figure 6:
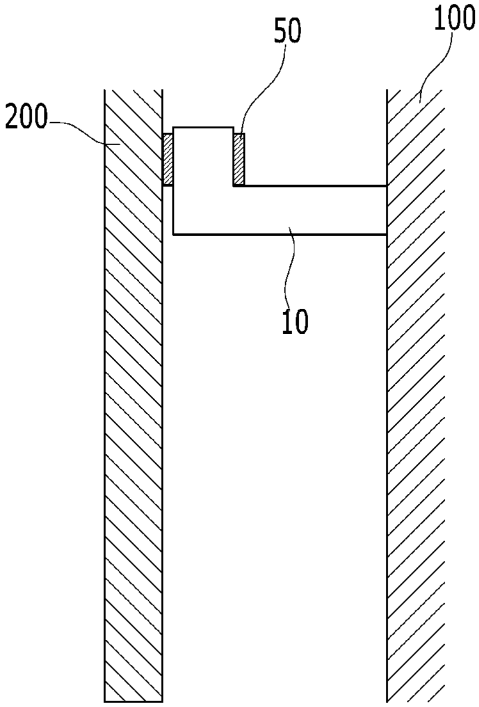
FIG. 6 is a cross-sectional view taken along line 'A-A' in FIG. 5.

FIG. 6 is a cross-sectional view taken along line ‘A-A’ in FIG. 5.

As illustrated in FIG. 6, the lock bar 10 is installed inside the door 100 and protrudes toward the ramp assembly 200. The ramp ring 50 is installed on a surface of the ramp assembly 200 directed toward the door 100. The ramp ring 50 includes an opening formed in a length direction of the vehicle body 2. The lock bar 10 includes a protruding portion protruding in the length direction of the vehicle body 2 so that the protruding portion is inserted into or released from the opening.

FIG. 5 is a view illustrating the rear sliding door 100 of the vehicle. As illustrated in FIG. 6, the protruding portion of the lock bar 10 protrudes toward the front side of the vehicle body 2, such that the protruding portion of the lock bar 10 may be naturally withdrawn from the ramp ring 50 when the rear sliding door 100 moves rearward. The protruding portion of the lock bar 10 provided on the front sliding door 100 protrudes toward the rear side of the vehicle body, such that the protruding portion of the lock bar 10 may be naturally withdrawn from the ramp ring when the front sliding door 100 moves forward.

Figure 7:
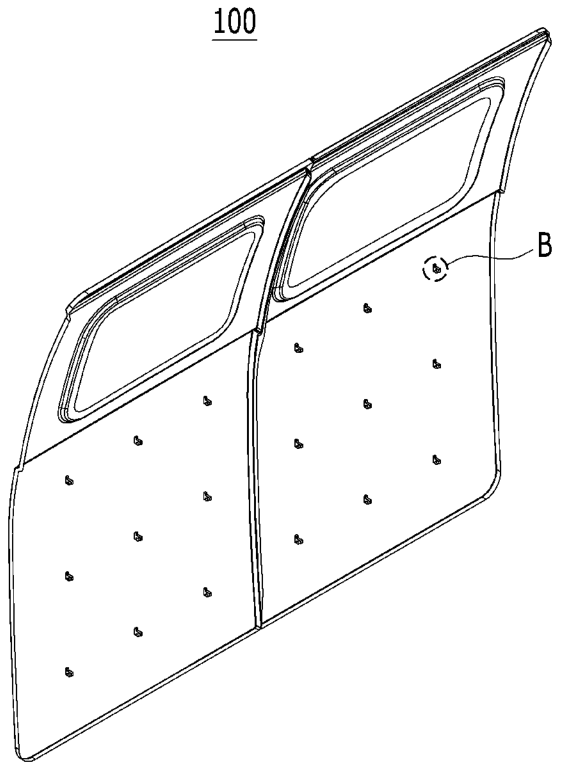
FIG. 7 is a view illustrating an inner vehicle part of the ramp panel of the door ramp structure according to an embodiment of the present invention.
Figure 8:
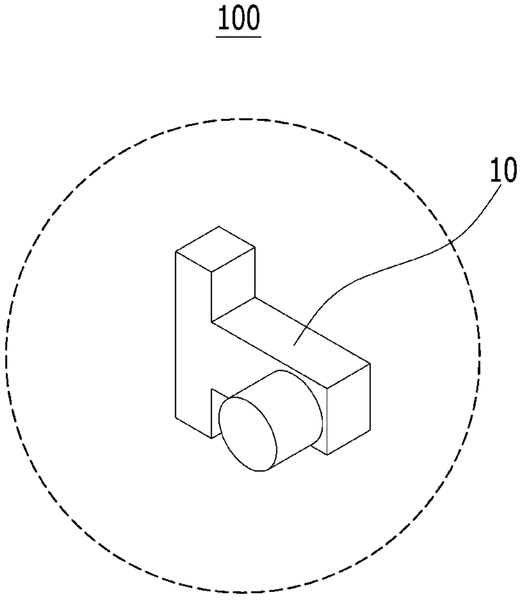
FIG. 8 is an enlarged view of part 'B' in FIG. 7.

FIG. 7 is a view illustrating an inner vehicle part of the ramp panel of the door ramp structure according to an embodiment of the present invention, and FIG. 8 is an enlarged view of part ‘B’ in FIG. 7.

As illustrated in FIG. 7, the plurality of lock bars 10 is installed inside the door 100 of the vehicle and protrudes toward the inside of the vehicle. As illustrated in FIG. 8, the protruding portions of the lock bar 10 installed on the rear sliding door 100 protrude toward the front side of the vehicle body. The protruding portion is formed in a circular column shape and coupled and inserted into the opening of the ramp ring 50 of the ramp assembly 200.

Figure 9:
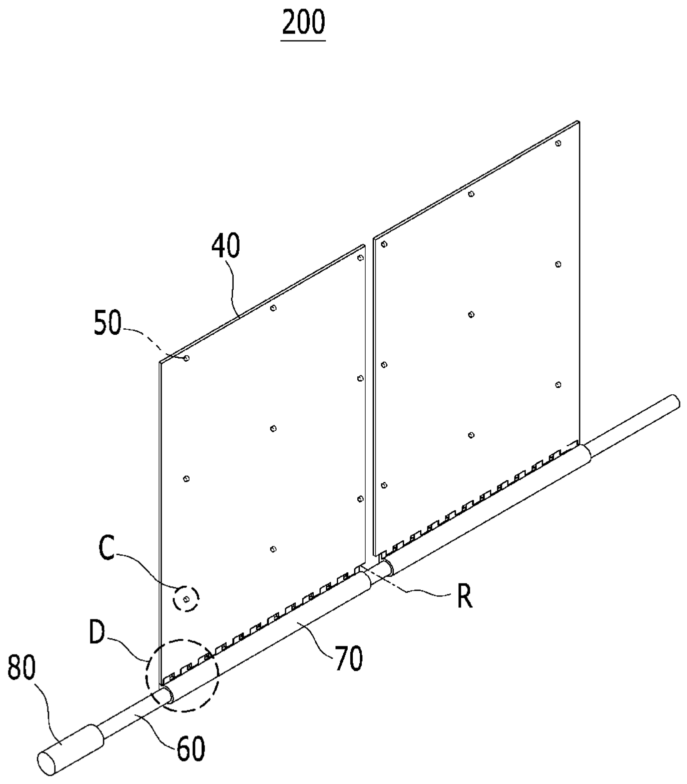
FIG. 9 is a view illustrating a ramp assembly of the door ramp structure according to an embodiment of the present invention.
Figure 10:
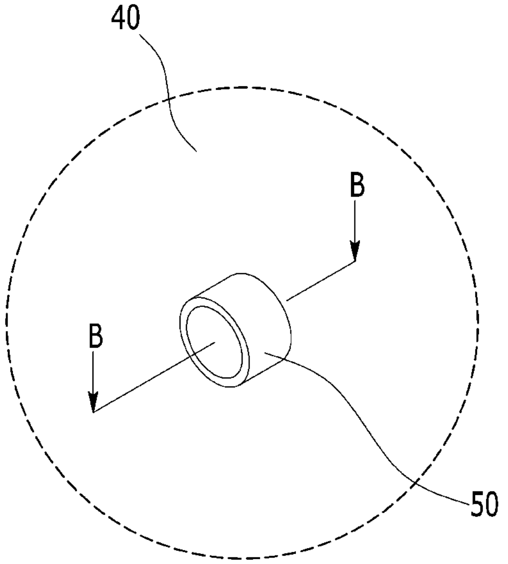
FIG. 10 is an enlarged view of part 'C' in FIG. 9.
Figure 11:
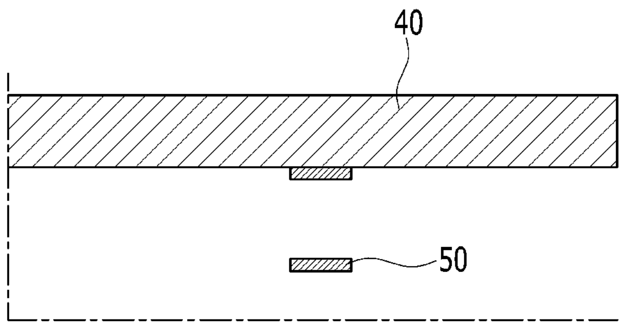
FIG. 11 is a cross-sectional view taken along line 'B-B' in FIG. 10.
Figure 12:
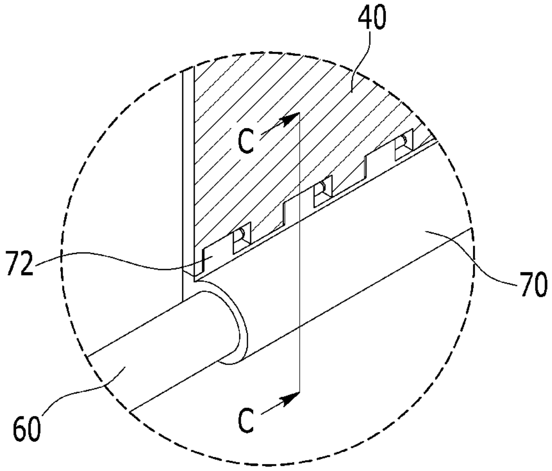
FIG. 12 is an enlarged view of part 'D' in FIG. 9.
Figure 13:
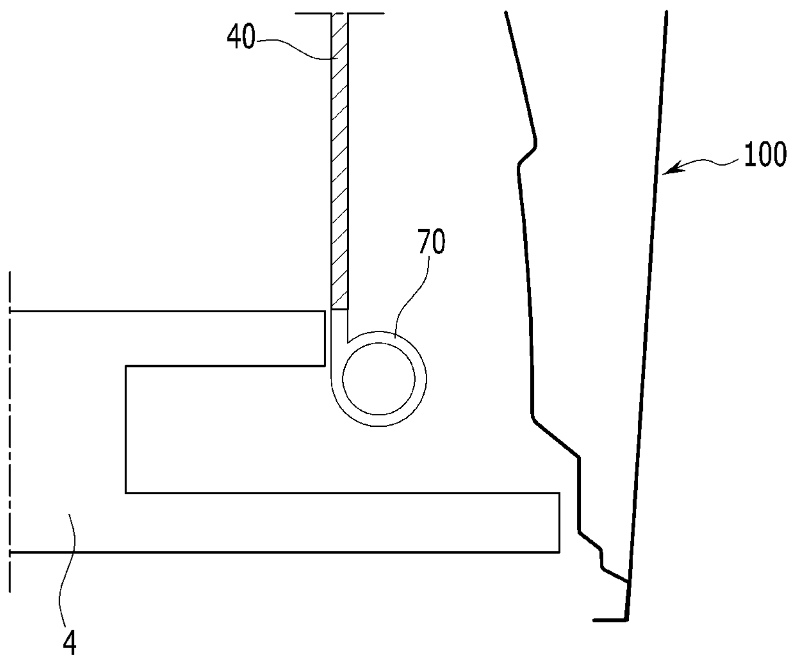
FIG. 13 is a cross-sectional view taken along line 'C-C' in FIG. 12.

FIG. 9 is a view illustrating the ramp assembly of the door ramp structure according to an embodiment of the present invention, FIG. 10 is an enlarged view of part ‘C’ in FIG. 9, FIG. 11 is a cross-sectional view taken along line ‘B-B’ in FIG. 10, FIG. 12 is an enlarged view of part ‘D’ in FIG. 9, and FIG. 13 is a cross-sectional view taken along line ‘C-C’ in FIG. 12.

With reference to FIG. 9, the ramp assembly 200 of the door ramp structure for a vehicle according to an embodiment of the present invention includes a ramp panel 40, a mover 70, and a lead screw 60.

The ramp panel 40 may be fixedly coupled to or decoupled from the inner surface of the door 100. The ramp panels 40 may be provided as a pair of ramp panels 40 symmetrically disposed at the front and rear sides of the vehicle body 2. That is, the ramp panels 40 may be provided at positions respectively corresponding to the front and rear sliding doors 100.

The plurality of ramp rings 50 may be provided on the surface of the ramp panel 40 directed toward the door 100. The ramp ring 50 is coupled to or decoupled from the lock bar 10 provided at the position corresponding to the door 100, such that the ramp panel 40 may be coupled to or decoupled from the door 100. As illustrated in FIGS. 10 and 11, the ramp ring 50 may include the opening formed in the length direction of the vehicle body 2. The protruding portion of the lock bar 10 may be inserted into the opening.

The mover 70 is selectively coupled to or decoupled from a lower end of the ramp panel 40. When the mover 70 rotates after the mover 70 and the ramp panel 40 are coupled to each other, the ramp panel 40 may turn in a direction perpendicular to the length direction of the vehicle body 2. As illustrated in FIGS. 12 and 13, the mover 70 may be provided in the form of a bar extending in the length direction of the vehicle body 2 and having a hollow portion therein. The lead screw 60 may be inserted into the hollow portion, such that the mover 70 may rotate when the lead screw 60 rotates.

A coupling protrusion is formed on an outer surface of the mover 70 so as to be coupled to or decoupled from the lower end of the ramp panel 40. The coupling protrusion may protrude in the length direction of the vehicle body 2, and the coupling protrusion may be inserted into an opening formed at the lower end of the ramp panel 40. The coupling protrusions may be provided as a plurality of coupling protrusions.

The mover 70 is moved by the rotation of the lead screw 60, and the coupling protrusion is inserted into the opening of the ramp panel 40. Then, when the lead screw 60 continuously rotates, the mover 70 may further move, such that the ramp panel 40 may move in the length direction of the vehicle body 2. The pair of movers 70 and the pair of ramp panels 40, which are provided on the front and rear doors 100, may move in opposite directions. When ends of the movers 70 come into contact with each other as the movers 70 move toward each other, the movements of the ramp panels 40 are stopped. When the lead screw 60 consistently rotates in the same direction, the pair of ramp panels 40 rotates toward the outside of the vehicle body 2 in a state in which the pair of ramp panels 40 is in contact with each other, such that the pair of ramp panels 40 may serve as a ramp.

Figure 14A:
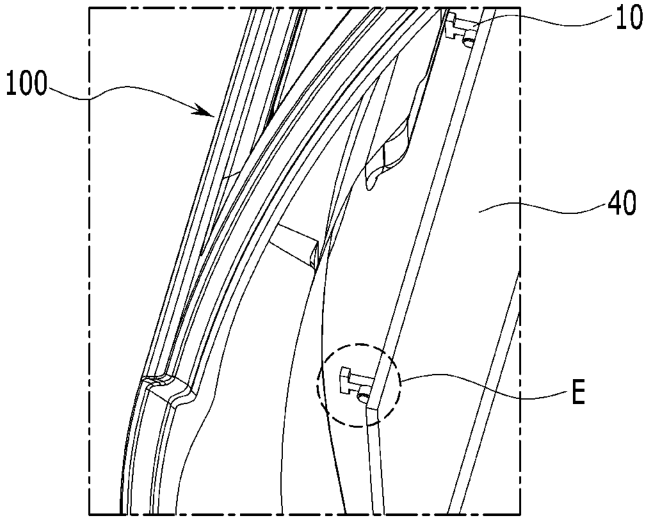
FIGS. 14A and 14B are views illustrating a state in which the ramp panel is coupled to the door of the door ramp structure according to an embodiment of the present invention.
Figure 14B:
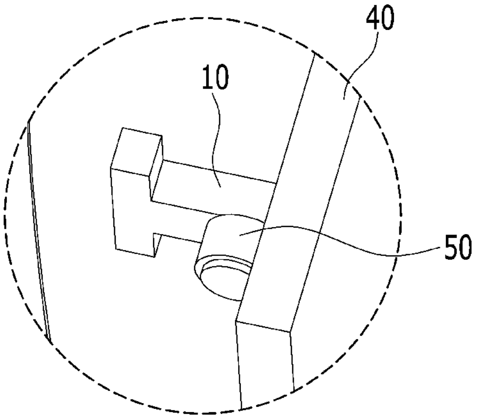

FIGS. 14A and 14B are views illustrating a state in which the ramp panel is coupled to the door of the door ramp structure according to an embodiment of the present invention.

With reference to FIGS. 14A and 14B, the lock bar 10 provided on the door 100 is coupled to the ramp ring 50 positioned at the corresponding position and provided on the ramp panel 40. The lock bar 10 includes the protruding portion protruding in the length direction of the vehicle body 2, and the protruding portion is inserted into the opening of the ramp ring 50 formed in the length direction of the vehicle body 2. FIG. 14A is a view illustrating the rear sliding door 100. The protruding portion of the lock bar 10 may protrude toward the front side of the vehicle body 2. When the rear sliding door 100 moves rearward and the ramp panel 40 is fixed to the mover 70, the ramp ring 50 of the ramp panel 40 is released from the protruding portion of the lock bar 10, such that the door 100 and the ramp panel 40 may be separated.

In the state in which the ramp panel 40 is coupled to the ramp ring 50, the ramp panel 40 moves together with the door 100 in a state in which the ramp panel 40 and the mover 70 are decoupled, such that the ramp panel 40 does not serve as the ramp. On the contrary, in the state in which the ramp panel 40 is decoupled from the ramp ring 50, the mover 70 and the ramp panel 40 are coupled, and the ramp panel 40 is moved by the movement of the mover 70. When the mover 70 is rotated by the continuous rotation of the lead screw 60, the ramp panel 40 may also rotate and serve as the ramp.

Figure 15A:
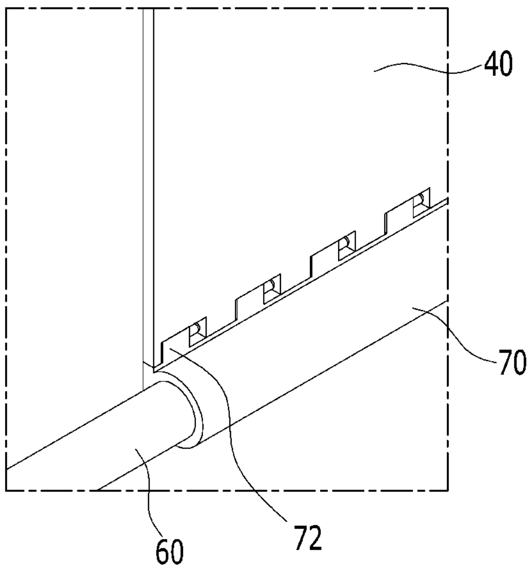
FIGS. 15A and 15B are views illustrating a state in which the ramp panel is decoupled from a mover of the door ramp structure according to an embodiment of the present invention.
Figure 15B:
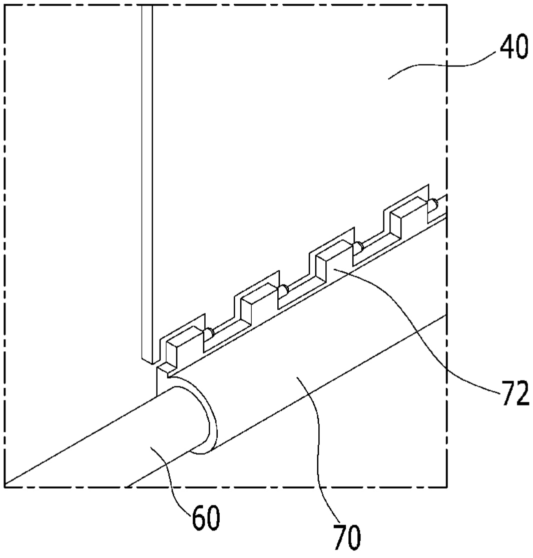

FIGS. 15A and 15B are views illustrating a state in which the ramp panel is decoupled from the mover of the door ramp structure according to an embodiment of the present invention.

As illustrated in FIGS. 15A and 15B, the mover 70 is provided in the form of a bar extending in the length direction of the vehicle body 2 and having the hollow portion therein. The lead screw 60 is inserted into the mover 70 in the length direction of the vehicle body 2. A screw thread is formed on an inner surface of the hollow portion of the mover 70, and a screw thread is formed on an outer surface of the lead screw 60, such that the screw threads may be screw-coupled to each other. Therefore, the mover 70 may be moved in the length direction of the vehicle body by the rotation of the lead screw 60.

The coupling protrusions may be formed on the outer surface of the mover 70 so as to be coupled to or decoupled from the lower end of the ramp panel 40 when the mover 70 moves in the direction toward the vehicle body 2. The coupling protrusion may be coupled to the lower end of the ramp panel 40 in a male/female engagement manner.

In case that the mover 70 and the ramp panel 40 are decoupled, the ramp panel 40 may move together with the door 100 in the state in which the ramp panel 40 is coupled to the door 100. The lead screw 60 rotates in the state in which the ramp panel 40 and the door 100 are coupled, such that the mover 70 is decoupled from the lower end of the ramp panel 40. Further, when the door 100 moves to the outside of the vehicle body 2, the lower end of the ramp panel 40 moves to the outside of the mover 70, i.e., toward the door 100, such that the ramp panel 40 and the mover 70 are completely separated from each other. Therefore, in this case, because the ramp panel 40 moves together with the door 100 in the state in which the ramp panel 40 is attached to the door 100, the ramp panel 40 does not serve as the ramp.

On the contrary, when the mover 70 and the lower end of the ramp panel 40 are coupled, the ramp panel 40 may be moved by the movement of the mover 70, and the mover 70 may be rotated by the continuous rotation of the lead screw 60, such that the ramp panel 40 may also rotate and serve as the ramp.

Figure 16:
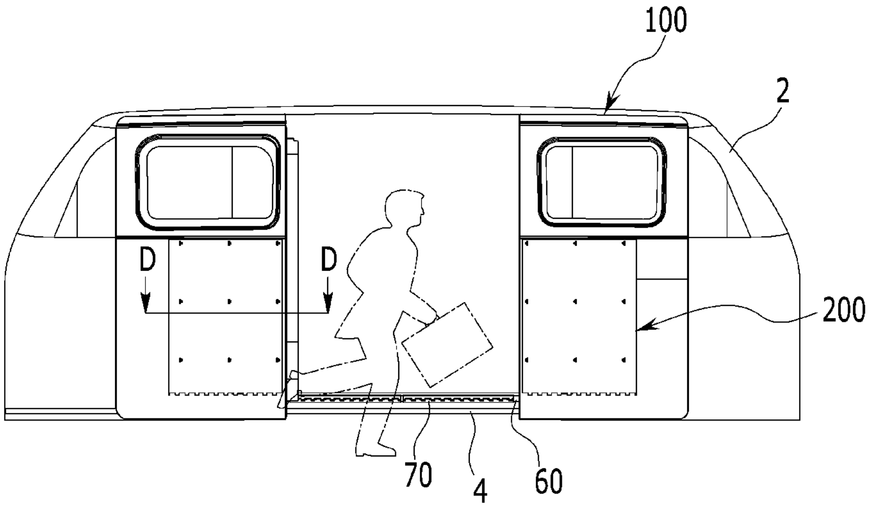
FIG. 16 is a view illustrating the vehicle interior state in which the sliding doors equipped with the door ramp structure according to an embodiment of the present invention are opened.
Figure 17:
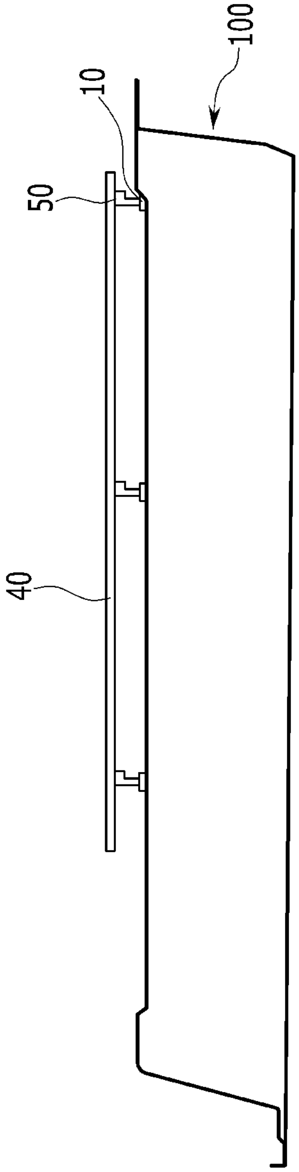
FIG. 17 is a cross-sectional view taken along line 'D-D' in FIG. 16.

FIG. 16 is a view illustrating the vehicle interior state in which the sliding doors equipped with the door ramp structure according to an embodiment of the present invention are opened, and FIG. 17 is a cross-sectional view taken along line 'D-D' in FIG. 16.

As illustrated in FIGS. 16 and 17, the ramp panel 40 is attached and coupled inside the door 100, and the lower end of the ramp panel 40 and the mover 70 are decoupled from each other. In this case, the ramp panel 40 is not used as the ramp, and the ramp panel 40 is moved together with the door 100 by the movement of the door 100 in the state in which the ramp panel 40 is attached and coupled to the door 100.

Figure 18A:
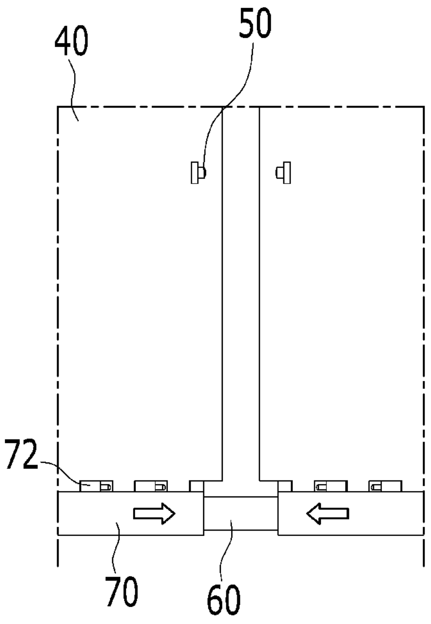
FIGS. 18A-18C are views illustrating a state in which the ramp panel and the mover are moved by an operation of a lead screw of the door ramp structure according to an embodiment of the present invention.
Figure 18B:
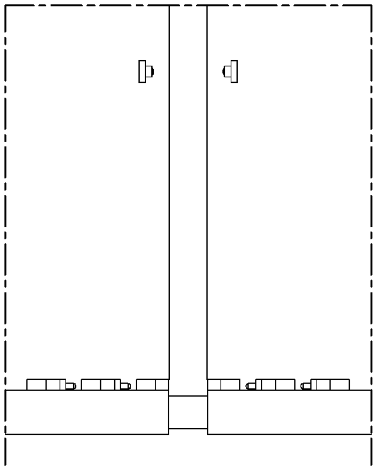
Figure 18C:
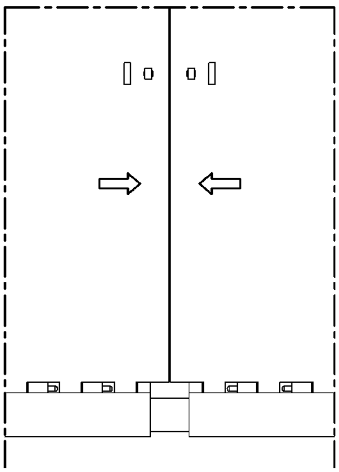

FIGS. 18A-18C are views illustrating a state in which the ramp panel and the mover are moved by the operation of the lead screw of the door ramp structure according to an embodiment of the present invention.

With reference to FIGS. 18A-18C, the lead screw 60 rotates first, and then the mover 70 moves, such that the ramp panel 40 serves as the ramp. The ramp panel 40 and the mover 70 may be respectively configured as the pair of ramp panels 40 and the pair of movers 70 symmetrically provided at the front and rear sides of the vehicle body 2. The pair of movers 70 may have screw threads inclined in different directions in the length direction of the vehicle body 2.

The ramp panel 40 and the mover 70 may be moved toward each other in the length direction of the vehicle body 2 by the rotation of the lead screw 60. As the ramp panel 40 and the mover 70 move toward each other, the coupling protrusion 72 of the mover 70 is coupled to the lower end of the ramp panel 40, and the ends of the pair of ramp panels 40 come into contact with each other, such that the mover 70 does not move any further.

Figure 19:
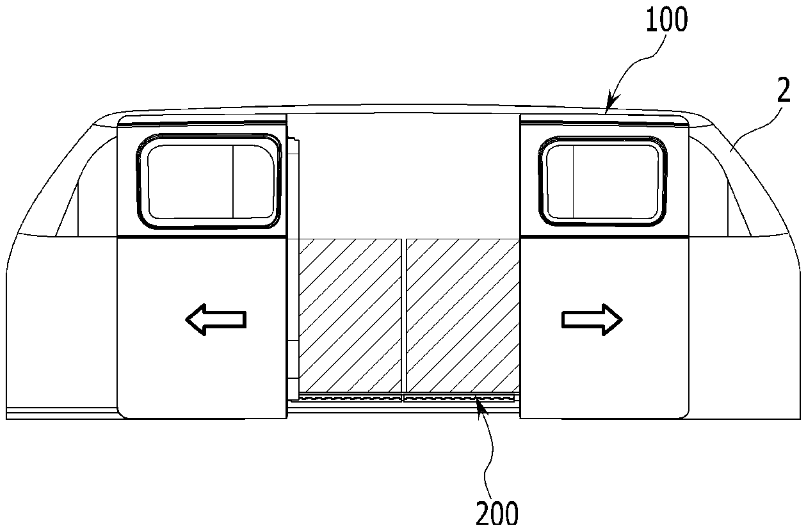
FIG. 19 is a view illustrating the vehicle exterior state in which the sliding doors equipped with the door ramp structure according to an embodiment of the present invention are opened and the ramp panels are separated from the doors.
Figure 20A:
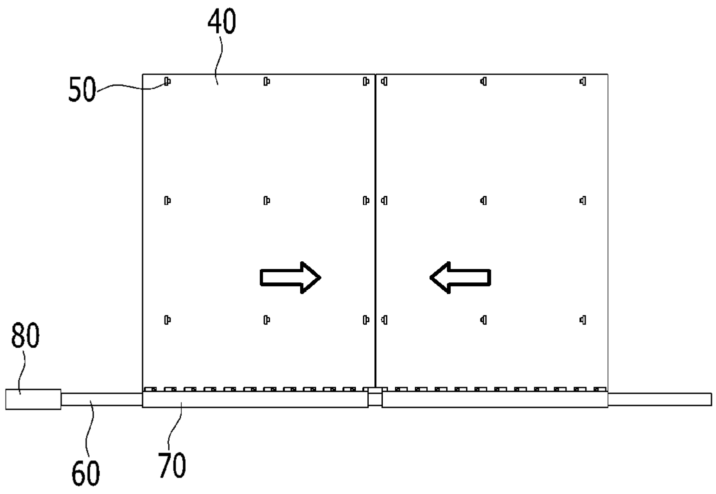
FIGS. 20A and 20B are views illustrating a state in which the ramp panel and the mover are moved toward each other and rotated by an operation of a motor of the door ramp structure according to an embodiment of the present invention.
Figure 20B:
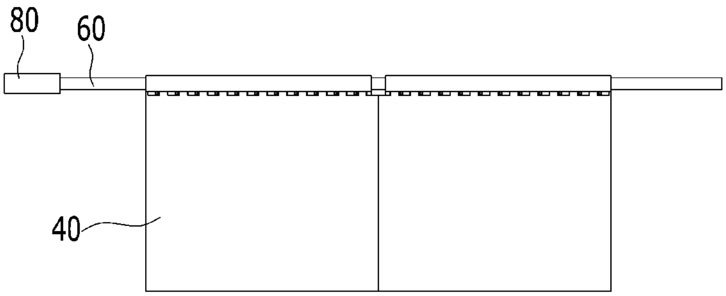
Figure 21:
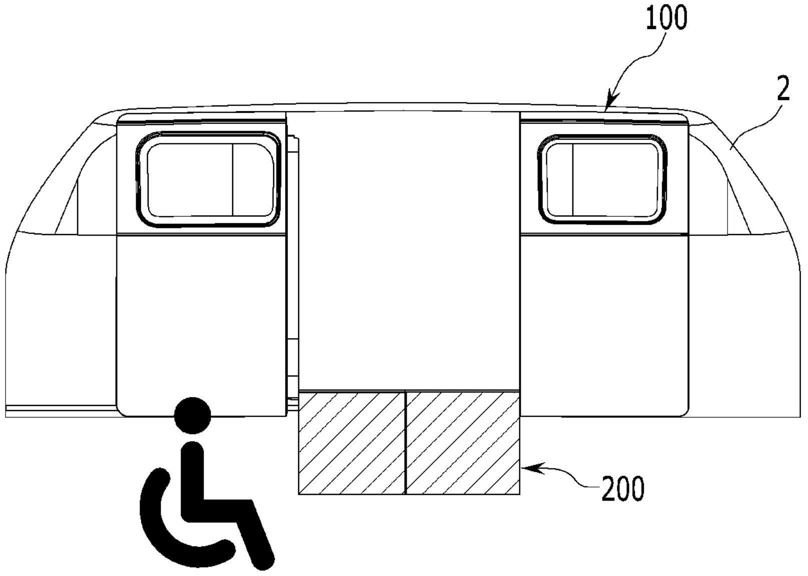
FIG. 21 is a view illustrating the vehicle exterior state in which the sliding doors equipped with the door ramp structure according to an embodiment of the present invention are opened and the ramp panels are separated from the doors and rotated.

FIG. 19 is a view illustrating the vehicle exterior state in which the sliding doors equipped with the door ramp structure according to an embodiment of the present invention are opened and the ramp panels are separated from the doors, FIGS. 20A and 20B are views illustrating a state in which the ramp panel and the mover are moved toward each other and rotated by the operation of the motor of the door ramp structure according to an embodiment of the present invention, and FIG. 21 is a view illustrating the vehicle exterior state in which the sliding doors equipped with the door ramp structure according to an embodiment of the present invention are opened and the ramp panels are separated from the doors and rotated.

With reference to FIGS. 19 to 21, the ramp ring 50 of the ramp panel 40 is decoupled from the lock bar 10 of the door, and the mover 70 and the lower end of the ramp panel 40 are coupled, such that the ramp panel 40 serves as the ramp. The ends of the pair of ramp panels 40 come into contact with each other as the pair of movers 70 and the pair of ramp panels 40 are moved toward one another by the rotation of the lead screw 60 while the doors 100 move away from each other. The rotation of the lead screw 60 may be performed by a motor 80 provided at an end of the lead screw 60. In the state in which the pair of ramp panels 40 is in contact with each other, the pair of ramp panels 40 is rotated to the outside of the vehicle body 2 by the continuous rotation of the lead screw 60 made by the operation of the motor 80. After the ramp panels 40 are sufficiently rotated, the operation of the motor 80 may be stopped, and the occupant may enter the vehicle from the outside of the vehicle through the ramp panels 40.

Meanwhile, a lidar may be installed at a side of the vehicle body 2, which is adjacent to the door 100 and allows the occupant to enter the vehicle. The lidar may detect whether a passenger is a general person or a disabled person. When the passenger is detected as being a general person, the ramp assemblies 200 of embodiments of the present invention do not serve as the ramp. That is, as the doors 100 are opened in the state in which the ramp rings 50 and the lock bars 10 are coupled and the movers 70 and the ramp panels 40 are decoupled, the ramp panels 40 coupled to the doors 100 are opened together with the doors 100 in the state in which the ramp panels 40 are attached and coupled to the doors 100. The general occupant may enter the vehicle through the opened doors 100.

When the lidar detects that the passenger is a disabled person, the ramp assemblies 200 of embodiments of the present invention serve as the ramp. That is, the ramp ring 50 and the lock bar 10 are decoupled, and the mover 70 and the ramp panel 40 are coupled. The lead screw 60 is rotated by the operation of the motor 80, and the pair of movers 70 and the pair of ramp panels 40 move toward one another, such that the ends of the pair of movers 70 come into contact with each other. In the meantime, the pair of doors 100 is opened. In the state in which the pair of ramp panels 40 is in contact with each other, the pair of ramp panels 40 is rotated to the outside of the vehicle body 2 by the continuous rotation of the lead screw 60. After the ramp panels 40 are sufficiently rotated to the extent that the ramp panels 40 come into contact with the ground outside the vehicle, the operation of the motor 80 may be stopped, and the occupant, who is a disabled person, may enter the vehicle by using the ramp panels 40.

As described above, according to the embodiments of the present invention, the ramp structure, which is detachably installed on the sliding doors of the vehicle, is applied, which may easily ensure a space at the lower end of the vehicle body and reduce costs and weight.

In addition, the ramp structure, which selectively operates so as to be used or not used depending on whether the occupant is a general person or a disabled person, is applied, which may significantly improve usability and improve a convenience for the occupant.

While the exemplary embodiments of the present invention have been described, the embodiments of the present invention are not limited to the described embodiments. The embodiments of the present invention cover all modifications that can be easily made from the described embodiments of the present invention by those skilled in the art and considered as being equivalent to the embodiments of the present invention.

The following reference identifiers may be used in connection with the drawings to describe various features of embodiments of the present invention.

2: Vehicle body
4: Floor member
10: Lock bar
40: Ramp panel
50: Ramp ring
60: Lead screw
70: Mover
72: Coupling protrusion
80: Motor
100: Door
200: Ramp assembly

What is claimed is:

1. A door ramp structure comprising:

a ramp assembly disposed inside a sliding door configured to open or close a door opening portion in a vehicle body of a vehicle, wherein the ramp assembly is configured to selectively operate in connection with an operation of the sliding door, and wherein the ramp assembly comprises:

a ramp panel configured to operate to be coupled and fixed to or decoupled from an inner surface of the sliding door;

a mover configured to be selectively coupled to or decoupled from a lower end of the ramp panel and to rotate to turn the ramp panel in a state in which the mover is coupled to the lower end of the ramp panel; and a lead screw coupled to the mover and configured to rotate the mover by rotating;

a lock bar disposed at a position corresponding to the sliding door; and a ramp ring disposed on the ramp panel;

wherein the ramp ring is configured to be coupled to or decoupled from the lock bar such that the ramp panel is coupled to or decoupled from the sliding door;

wherein a coupling protrusion of the mover is decoupled from the ramp panel in a state in which the ramp ring and the lock bar are coupled; and wherein the coupling protrusion of the mover is coupled to the ramp panel in a state in which the ramp ring and the lock bar are decoupled.

2. The door ramp structure of claim 1, wherein:

the ramp ring comprises an opening extending in a length direction of the vehicle body; and the lock bar comprises a protruding portion protruding in the length direction of the vehicle body, wherein the protruding portion is configured to be inserted into or released from the opening in the ramp ring.

3. The door ramp structure of claim 1, wherein the mover comprises a bar extending in a length direction of the vehicle body, the mover having a hollow portion therein.

4. The door ramp structure of claim 3, wherein a screw thread is disposed on an inner surface of the hollow portion of the mover and is configured to be screw-coupled to a screw thread disposed on an outer surface of the lead screw.

5. The door ramp structure of claim 4, wherein the coupling protrusion is disposed on an outer surface of the mover and is configured to be coupled to or decoupled from, in a male/female engagement manner, the lower end of the ramp panel in a state in which the mover moves.

6. The door ramp structure of claim 1, further comprising a motor disposed at an end of the lead screw, wherein the lead screw is configured to be rotated by an operation of the motor.

7. The door ramp structure of claim 1, wherein:

the ramp panel is one of a pair of ramp panels;

the mover is one of a pair of movers; and the pair of ramp panels and the pair of movers are symmetrically provided at front and rear sides of the vehicle body.

8. The door ramp structure of claim 7, wherein the pair of movers comprises screw threads inclined in different directions in a length direction of the vehicle body.

9. The door ramp structure of claim 8, wherein the ramp panels and the movers are configured to be moved toward or away from each other in the length direction of the vehicle body by a rotation of the lead screw.

10. The door ramp structure of claim 9, wherein:

a movement of the ramp panel is stopped at a point in which ends of the ramp panels come into contact with each other as the ramp panels are moved toward each other by the rotation of the lead screw in a first direction; and the ramp panels are configured to be rotated toward an outside of the vehicle body by a continuous rotation of the lead screw in the first direction in a state in which the ramp panels are in contact with each other.

11. A vehicle comprising:

a vehicle body comprising a floor member defining a lateral side of a bottom portion of the vehicle body, a door opening portion, and a sliding door configured to open or close the door opening portion; and a ramp assembly disposed inside the sliding door and having a lower end coupled to the floor member, wherein the ramp assembly is configured to selectively operate in connection with an operation of the sliding door, and wherein the ramp assembly comprises:

a ramp panel configured to operate to be coupled and fixed to or decoupled from an inner surface of the sliding door;

a mover configured to be selectively coupled to or decoupled from a lower end of the ramp panel and to rotate to turn the ramp panel in a state in which the mover is coupled to the lower end of the ramp panel; and a lead screw coupled to the mover and configured to rotate the mover by rotating;

a lock bar disposed at a position corresponding to the sliding door; and a ramp ring disposed on the ramp panel;

wherein the ramp ring is configured to be coupled to or decoupled from the lock bar such that the ramp panel is coupled to or decoupled from the sliding door;

wherein a coupling protrusion of the mover is decoupled from the ramp panel in a state in which the ramp ring and the lock bar are coupled; and wherein the coupling protrusion of the mover is coupled to the ramp panel in a state in which the ramp ring and the lock bar are decoupled.

12. The vehicle of claim 11, wherein:

the ramp ring comprises an opening extending in a length direction of the vehicle body; and the lock bar comprises a protruding portion protruding in the length direction of the vehicle body, wherein the protruding portion is configured to be inserted into or released from the opening in the ramp ring.

13. The vehicle of claim 11, wherein the mover comprises a bar extending in a length direction of the vehicle body, the mover having a hollow portion therein.

14. The vehicle of claim 13, wherein a screw thread is disposed on an inner surface of the hollow portion of the mover and is configured to be screw-coupled to a screw thread disposed on an outer surface of the lead screw.

15. The vehicle of claim 14, wherein the coupling protrusion is disposed on an outer surface of the mover and is configured to be coupled to or decoupled from, in a male/female engagement manner, the lower end of the ramp panel in a state in which the mover moves.

16. The vehicle of claim 11, further comprising a motor disposed at an end of the lead screw, wherein the lead screw is configured to be rotated by an operation of the motor.

17. A door ramp structure comprising:

a ramp assembly disposed inside a sliding door configured to open or close a door opening portion in a vehicle body of a vehicle, wherein the ramp assembly is configured to selectively operate in connection with an operation of the sliding door, and wherein the ramp assembly comprises:

a ramp panel configured to operate to be coupled and fixed to or decoupled from an inner surface of the sliding door;

a mover configured to be selectively coupled to or decoupled from a lower end of the ramp panel and to rotate to turn the ramp panel in a state in which the mover is coupled to the lower end of the ramp panel, wherein the mover comprises a bar extending in a length direction of the vehicle body, wherein the mover has a hollow portion therein, and wherein a screw thread is disposed on an inner surface of the hollow portion of the mover;

a lead screw coupled to the mover and configured to rotate the mover by rotating, wherein the screw thread is configured to be screw-coupled to a screw thread disposed on an outer surface of the lead screw; and a coupling protrusion disposed on an outer surface of the mover and configured to be coupled to or decoupled from, in a male/female engagement manner, the lower end of the ramp panel in a state in which the mover moves.

18. The door ramp structure of claim 17, further comprising:

a lock bar disposed at a position corresponding to the sliding door; and a ramp ring disposed on the ramp panel, wherein the ramp ring is configured to be coupled to or decoupled from the lock bar such that the ramp panel is coupled to or decoupled from the sliding door.

19. The door ramp structure of claim 18, wherein:

the ramp ring comprises an opening extending in a length direction of the vehicle body; and the lock bar comprises a protruding portion protruding in the length direction of the vehicle body, wherein the protruding portion is configured to be inserted into or released from the opening in the ramp ring.

20. The door ramp structure of claim 17, further comprising a motor disposed at an end of the lead screw, wherein the lead screw is configured to be rotated by an operation of the motor.

* * * * *